Dec. 6, 1927.
J. T. NORMAN
1,651,622
SEPARATOR ROLLER AND BEARING THEREFOR
Filed Oct. 18, 1926 2 Sheets-Sheet 2
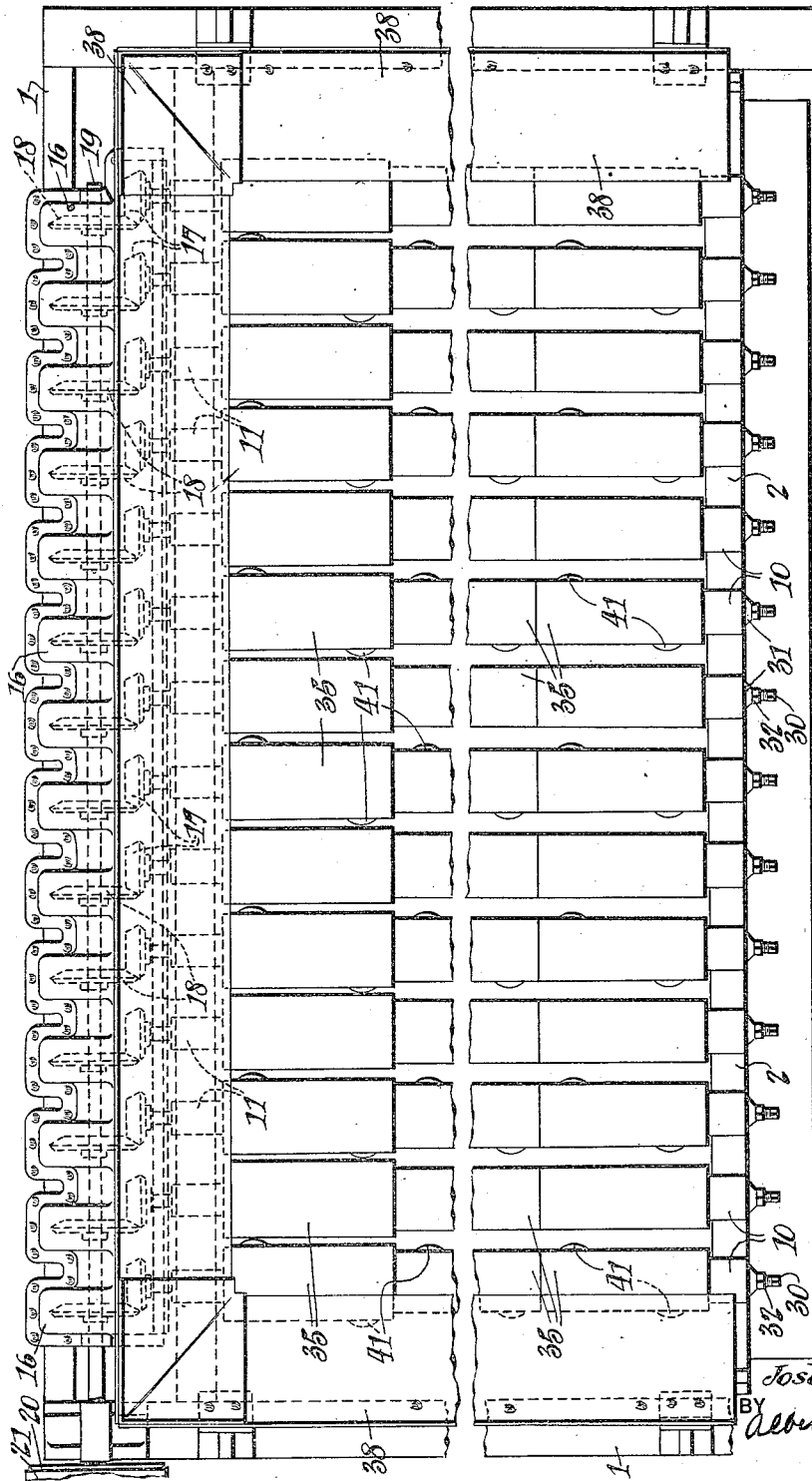
INVENTOR
Joseph T. Norman
BY
Albert T. Diederich
ATTORNEY Patented Dec. 6, 1927.

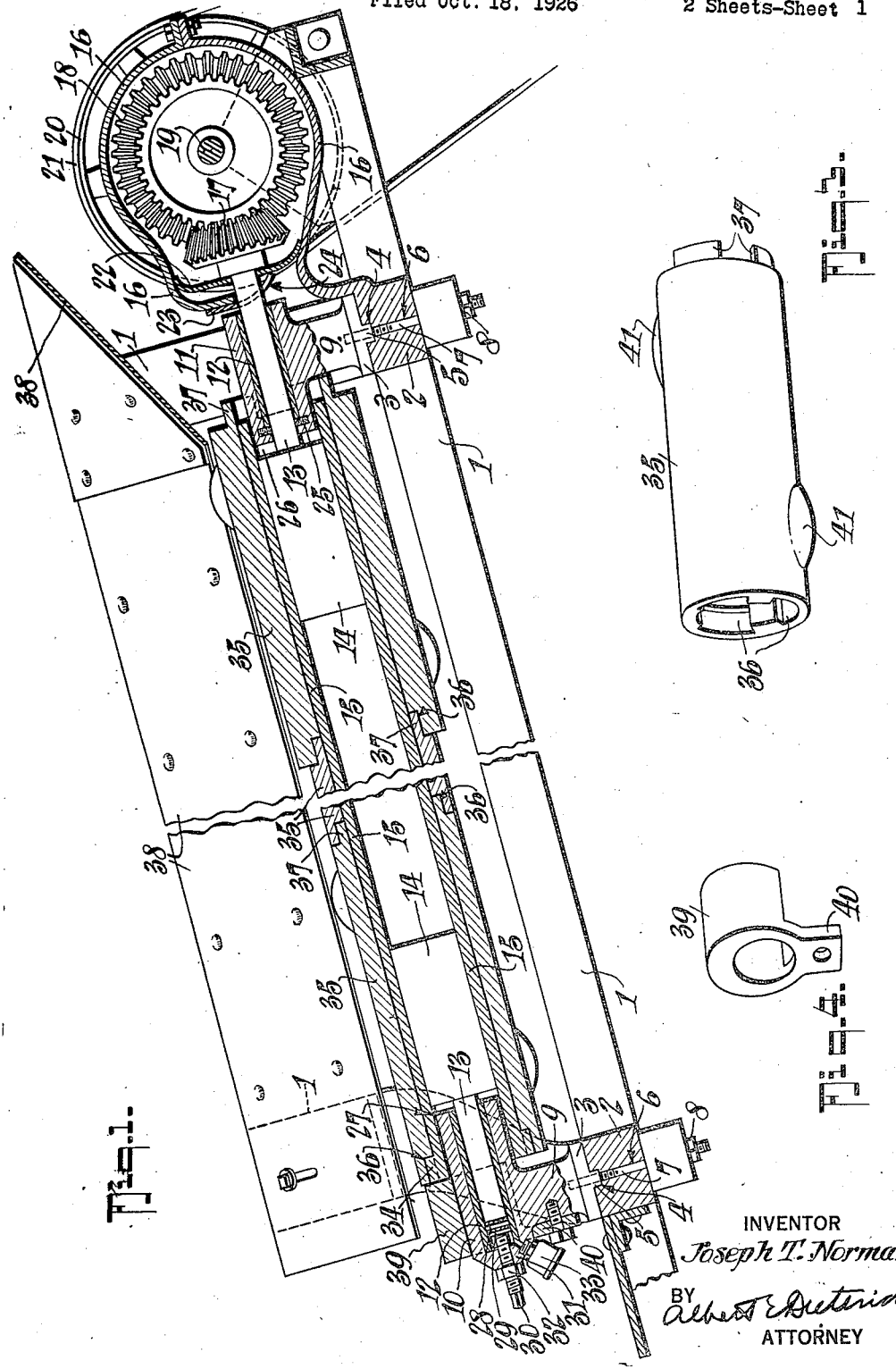

1,651,622

UNITED STATES PATENT OFFICE.

JOSEPH T. NORMAN, OF FREDERICK, MARYLAND.

SEPARATOR ROLLER AND BEARING THEREFOR.

Application filed October 18, 1926. Serial No. 142,387.

The invention generally relates to coal and slate separators and primarily has for its object to provide certain new and useful improvements in such separators of the general type disclosed in my Patent #1,025,587 issued May 7, 1912 whereby undue wear of the separator rollers and the bearings is overcome and a great economy thus effected.

In the use of all types of separators adapted for separating slate from coal and coke immense sums must be expended to replace parts of the devices which become worn beyond efficient usefulness in an alarmingly short time due to the abrasive action of the coal and coke scraping thereover. While the wear incident to the use of the apparatus disclosed in my patent referred to is much less than that occasioned by the use of stationary screens or grates due to the fact that the contact of the coal and coke is a rolling contact, passing over the rollers all rotating in one direction, nevertheless the rollers do wear much more quickly than is desirable and the end bearings provided therefor wear out very quickly due to the fact that they are unprotected against the abrasive action of the coal and coke passed thereover or the induction of dust particles of the products directly into the interior of such bearings.

Therefore, in its more detailed nature, the invention seeks to provide wear resisting separator rollers equipped with interchangeable and replaceable wear resisting sleeve and bearings for the rollers which are protected against abrasive action from without and so constructed and arranged that coal and coke dust particles cannot find their way into the interior thereof.

With the above and other objects in view the invention further resides in the novel details of construction, combination and arrangement of parts, all of which will be first fully described in the following detailed description, then be particularly pointed out in the appended claims, reference being had to the accompanying drawings, in which:

Figure 1 is a vertical longitudinal section of a separator embodying my invention.

Figure 2 is a plan view of a separator embodying my invention.

Figure 3 is a detail perspective view of one wear sleeve.

Figure 4 is a detail perspective view of a protective casing for a bearing.

In the drawings, in which like numerals of reference indicate like parts in all of the figures, 1 represents the supporting framing which includes the upper and lower transverse bearing supporting beams 2 upon which the bases 3 of the bearings hereinafter more specifically referred to are mounted. The beams 2 are provided with transverse grooves 4 adapted to receive the transverse tenons 5 which project from the bottom surfaces of the bearing bases 3, the said tenon and groove connections serving to facilitate mounting of the bearings in transverse alignment and preventing twisting of the said bearings out of axial alignment.

For securing the bases of the bearings removably upon the transverse beams 2 the said beams each are provided with a transverse grooveway 6 through which project the threaded pins 7 which extend downwardly from the bases 3 through the said grooveway and which are secured beneath the beams as at 8 to secure the bearings to their adjusted position upon the said beams.

A shank 9 projects upwardly from each bearing base 3 and joins the bearing member proper, which said bearings are each in the nature of a hollow sleeve, the lower ones being designated 10 and being closed at their lower ends while the upper bearings are designated 11 and are open at both ends, as illustrated in Figure 1 of the drawings, and for a purpose soon to be described.

Each of the bearings 10—11 are provided with a central bore adapted to receive a bronze bearing bushing 12, both said bearing bushings being in coaxial relation and adapted to receive the reduced shaft extensions 13 of the bearing heads 14, one thereof being secured in each end of the roller core 15.

The roller core 15 is in the nature of a hollow cylindrical body which may be constructed of relatively soft metal in view of the fact that when the device is used for separating coal or coke the said core would not be subjected to wear by reason of the provision of means later to be described and the heads 14 may be shrink-secured into the ends of the said core or otherwise secured in the ends of the core, as may be desired.

The lower bearing shaft end 13 terminates short of the end of the lower bearing bushing 12 and the upper bearing shaft end 13 extends through the bearing 11 and its bushing 12 and into the gear housing 16, where a small bevelled pinion 17 is secured upon the end thereof and which is adapted to mesh with a larger bevelled gear 18 mounted upon the transverse driving shaft 19 housed in the said housing 16 and having suitable bearing upon the framing 1, power being applied to the shaft 19 through the pulley and transmission belt connection 20—21.

As the separator device is to be positioned on an incline, in the manner indicated in Figure 1 of the drawing, and as the gears 17—18 are to run in a suitable lubricant in the housing 16, a washer 22 may be mounted beneath each pinion 17 and a lubricant drip plate 23 may be mounted upon the upper shaft ends 13 so that its bent fingers 24 will tend to cause such lubricant as may contact with the plate 23 to drip back into position for working its way into the housing 18.

For further providing the holding of lubricant the upper bearing bushing 12 terminates short of the lower end of the bearing 11 and at the point of its termination the said bearing is provided with an annular groove in which a suitable packing 25 is mounted and serves to hold the lubricant.

It will be also observed that the uppermost head 14 is spaced inwardly of the upper end of the core 15 to provide an annular recess 26 in which the lowermost end of the bearing projects thereby providing for an overhanging of the upper end of the core 15 which will serve to prevent induction of coal dust or other abrasive substances into the upper bearing.

It will also be noted that each lowermost head 14 is spaced inwardly of the lower end of its respective core 15 a considerable distance providing an annular recess 27 adapted to receive the upper end of the respective lower bearing 10 in the manner illustrated in Figure 1 of the drawing, thereby providing for a considerable extension of the lower end of said core over the upper end of the said bearing to effectively perfect the induction of coal dust or other abrasive substance into the said bearing. A suitable end thrust bearing 28 is mounted in the lower end of the lower bearing bushing 12 to be engaged at one side by the end of the lower bearing shaft end 13 and at the other side by a washer 29 engaged by a set screw 30 projected through a threaded tap in the closed end 31 of the bearing 10 and whereby the roller core may be adjusted longitudinally to provide for perfect functioning of the power transmission agency 17—18. A jam nut 32 may be provided to secure the screw 30 to adjusted positions, and a force feed grease cup 33 may be projected into the end wall 31 and adapted to communicate with the interior of the bearing to provide for lubricating the same.

In the foregoing description, I have disclosed my bearing members for the separator rollers which are so constructed and mounted correlatively to the ends of the separator rollers that the induction of coal dust or other abrasive particles into the interior of the bearings is rendered impossible and by thus eliminating undue wear on the bearings their life is greatly prolonged.

While the separator illustrated in this application is adapted for use for grading fruits or separating materials other than coal and coke it is for the latter uses that the same has been specifically designed and for this purpose I have designed and disclosed wear sleeve units adapted to be mounted over the soft metal core 15 to take up all wear to which the device is subjected, the said sleeves being so constructed that they are replaceable and interchangeable. If it should be desired to use the device for separating materials less abrasive than coal and coke the device could be used without mounting the wear sleeves thereupon as they would not be necessary in such cases.

For the purposes mentioned I provide the core 15 at its lower ends with a notched flange enlargement 34 adapted to serve as an end abutment to prevent the sleeve units 35 from sliding off the lower end of the core into engagement with the lower bearing member.

Each wear sleeve 35 is constructed as an interchangeable unit or, in other words, all of the sleeves 35 are of like construction with the exception of the uppermost one thereof which is made of larger diameter for the purpose soon to be described. Each sleeve 35 is in the nature of a hollow cylinder having a notched annular recess 36 in one end and a notched flange projection 37 at its opposite end, the notched recess 36 of the lowermost unit 35 being adapted to coengage with the notched enlargement 34 at the lower end of the core 15, while the extension 37 of the said lower unit coengages with the notched recess 37 of the next unit, the remaining unit or units being similarly interlocked so that while the units are thus mounted in a manner facilitating quick removal and providing no external projections, they are all caused to rotate in unison with the core 15.

The uppermost sleeve unit 35 is made larger in diameter than the remaining units because of the fact that the upper end of the separator receives the most wear, the coal or coke being dumped into the upper end of the sleeve.

Thus the greatest wearing surface is provided at the point where the most wear occurs.

By providing the interchangeable and replaceable wear sleeve units 35 all of the units may be changed at any time desired or such individual ones thereof as need replacement, it being understood that the uppermost sleeve 35 need not be discarded when it becomes partially worn as the same would be reduced to approximately the diameter of the normal size sleeves and when thus reduced in size could be replaced for one of the said sleeves.

To also prevent the exposed end of each lower bearing member 10 from the abrasive action of coal or coke, I provide a protective sleeve 39 which is provided with a central bore for snugly fitting over the sleeve 10 and which may have an eccentric wear face, the thickened portion of which is presented toward the top for receiving the wear at the top where it is most severe.

Suitable side and rear end guide plates 38 are provided serving to provide a sort of hopper having the separator rollers as a screening floor and adapted to receive the product to be separated.

Each head 39 is provided with a downwardly extended shank 40 which may be screw-secured to the respective bearing shank 9 in the manner illustrated in Figure 1 of the drawing.

In the use of common types of screening grates, screens and the like, much difficulty and great expense is occasioned by the excessive wear to which said devices are subjected by the abrasive action of coal, coke and the like. The parts wear out so quickly that enormous sums must be expended to provide for replacement which greatly adds to the cost of production of the material being graded.

In the use of devices of the type disclosed in my patent herein referred to, in which rotating rollers are provided, much of the expense incident to the quick wearing out of parts is eliminated, but the necessary cost for replacement is still enormous and adds greatly to the cost of production even by the use of such efficient apparatus.

By providing a structure as herein disclosed in which a soft roller core may be employed, which may be manufactured relatively cheaply and by the use of individually removable, replaceable and interchangeable hard metal wear sleeves, especially designed abrasive dust-proof bearings, and protective heads therefor, means is provided for grading the coal with a maximum of efficiency and a minimum of wear, thus saving greatly in the expense of the operation of grading and reducing the final cost of the product.

It may be desired to provide a more positive turn-over of the coal in interest of more efficient coal grading and separation. To accomplish this each sleeve 35 of alternate rollers may be equipped with a pair of turn-over lugs 41 projecting a short distance from the peripheral face thereof, each adjacent one end of the sleeve and diametrically opposite the other.

This specific arrangement of the lugs 41 may, of course, be varied. If desired, they may even be employed on alternate rollers which are in one piece throughout their length and not equipped with removable wear sleeves.

From the foregoing description, taken in connection with the accompanying drawings it is thought the complete construction, the manner of use and the advantages of my invention will be readily apparent to those skilled in the art to which my invention relates.

What I claim is:

1. A device of the class described comprising a plurality of rollers mounted in spaced relation, and means for rotating the rollers, said rollers each comprising a core and a plurality of removable wear sleeves mounted thereon and interconnected at their ends.

2. A device of the class described comprising a plurality of rollers mounted in spaced relation, and means for rotating said rollers, said rollers each comprising a core and a plurality of removable and interchangeable wear sleeves mounted thereon and interconnected at their ends.

3. A device of the class described comprising a plurality of rollers mounted in spaced relation, and means for rotating said rollers, said rollers each comprising a core and a plurality of removable and interchangeable wear sleeves mounted thereon and interconnected at their ends, and means to cause one sleeve of each roller to rotate with the respective core.

4. A device of the class described comprising a plurality of rollers mounted in spaced relation, and means for rotating said rollers, said rollers each comprising a core and a plurality of removable and interchangeable wear sleeves mounted thereon, and means to cause one sleeve to rotate with the core and the remainder of the sleeves to move with the one sleeve.

5. A device of the class described comprising a plurality of rollers mounted in spaced relation, and means for rotating the rollers, said rollers each comprising a core and a plurality of removable and interchangeable wear sleeves mounted thereon, one said sleeve being of greater diameter than the remainder of the sleeves.

6. A device of the class described comprising a plurality of rollers mounted in spaced relation, and means for rotating said rollers, said rollers each comprising a cylindrical core having a notched enlargement at one end and a wear sleeve adapted to fit over the core and having an end thereof notched to receive the enlargement of the core for the purposes specified.

7. A device of the class described comprising a plurality of rollers mounted in spaced relation, and means for rotating said rollers, said rollers each comprising a cylindrical core having a notched enlargement at one end and a plurality of removable and interchangeable wear sleeves each having notches in one end and a notched extension at the other end for the purposes specified.

8. A device of the class described comprising a plurality of rollers mounted in spaced relation, each having a reduced bearing shaft end at each extremity thereof and an annular recess surrounding the shaft end at at least one end thereof, and a bearing for receiving each shaft end, at least one of said bearings having a sleeve projecting into the recess surrounding the particular shaft end.

9. The combination with an inclined separator roller having a reduced bearing shaft end at its lower extremity and an annular recess surrounding the shaft end and extending a distance into the roller end, of a bearing having a sleeve for receiving the shaft end and which projects into the annular recess in the roller end.

10. The combination with an inclined separator roller having a reduced bearing shaft end at its lower extremity and an annular recess surrounding the shaft end and extending a distance into the roller end, of a bearing having a sleeve for receiving the shaft end and which projects into the annular recess in the roller end, means at the upper extremity of the roller for imparting rotation thereto, and a set screw for engaging the reduced shaft end and adaptable for taking up longitudinal play to retain proper relation of the rotation providing means.

11. The combination with an inclined separator roller having a reduced bearing shaft end at its lower extremity and an annular recess surrounding the shaft end and extending a distance into the roller end, of a bearing having a sleeve for receiving the shaft end and which projects into the annular recess in the roller end, means at the upper extremity of the roller for imparting rotation thereto, a thrust bearing member in the bearing for taking up end thrust on the reduced shaft end, and a set screw directed axially through the bearing to engage the thrust bearing member to take up play.

12. The combination with an inclined separator roller having a reduced bearing shaft end at its lower extremity and an annular recess surrounding the shaft end and extending a distance into the roller end, of a bearing having a sleeve for receiving the shaft end and which projects into the annular recess in the roller end, and a protective sleeve head mountable over the exposed portion of the bearing sleeve.

13. A device of the class described comprising a plurality of rollers mounted in spaced relation, and means for rotating said rollers, said rollers each comprising a cylindrical core having a notched enlargement at one end and a wear sleeve adapted to fit over the core and having an end thereof notched to receive the enlargement of the core, each said core having a reduced bearing shaft end at its lower extremity and an annular recess surrounding the shaft end and extending a distance into the core end, and a bearing for each shaft end having a sleeve for receiving the shaft end and which projects into the annular recess in the core end.

14. A device of the class described comprising a plurality of rollers mounted in spaced relation, and means for rotating said rollers, said rollers each comprising a cylindrical core having a notched enlargement at one end and a plurality of removable and interchangeable wear sleeves each having notches in one end and a notched extension at the other end, each said core having a reduced bearing shaft end at its lower extremity and an annular recess surrounding the shaft end and extending a distance into the core end, and a bearing for each shaft end having a sleeve for receiving the shaft end and which projects into the annular recess in the core end.

15. A device of the class described comprising a plurality of rollers mounted in spaced relation, and means for rotating the rollers, said rollers each comprising a core and a plurality of removable wear sleeves mounted thereon, and each sleeve of alternate rollers having a plurality of turn-over lugs projecting from its peripheral face for the purposes specified.

16. A device of the class described comprising a plurality of rollers mounted in spaced relation, and means for rotating the rollers, said rollers each comprising a core and a plurality of removable wear sleeves mounted thereon, and each sleeve of alternate rollers having a pair of turn-over lugs projecting from its peripheral face for the purposes specified, the lugs of each sleeve being positioned at diametrically opposite sides of the sleeve one adjacent each end thereof.

JOSEPH T. NORMAN.